United States Patent Office 2,703,437
Patented Mar. 8, 1955

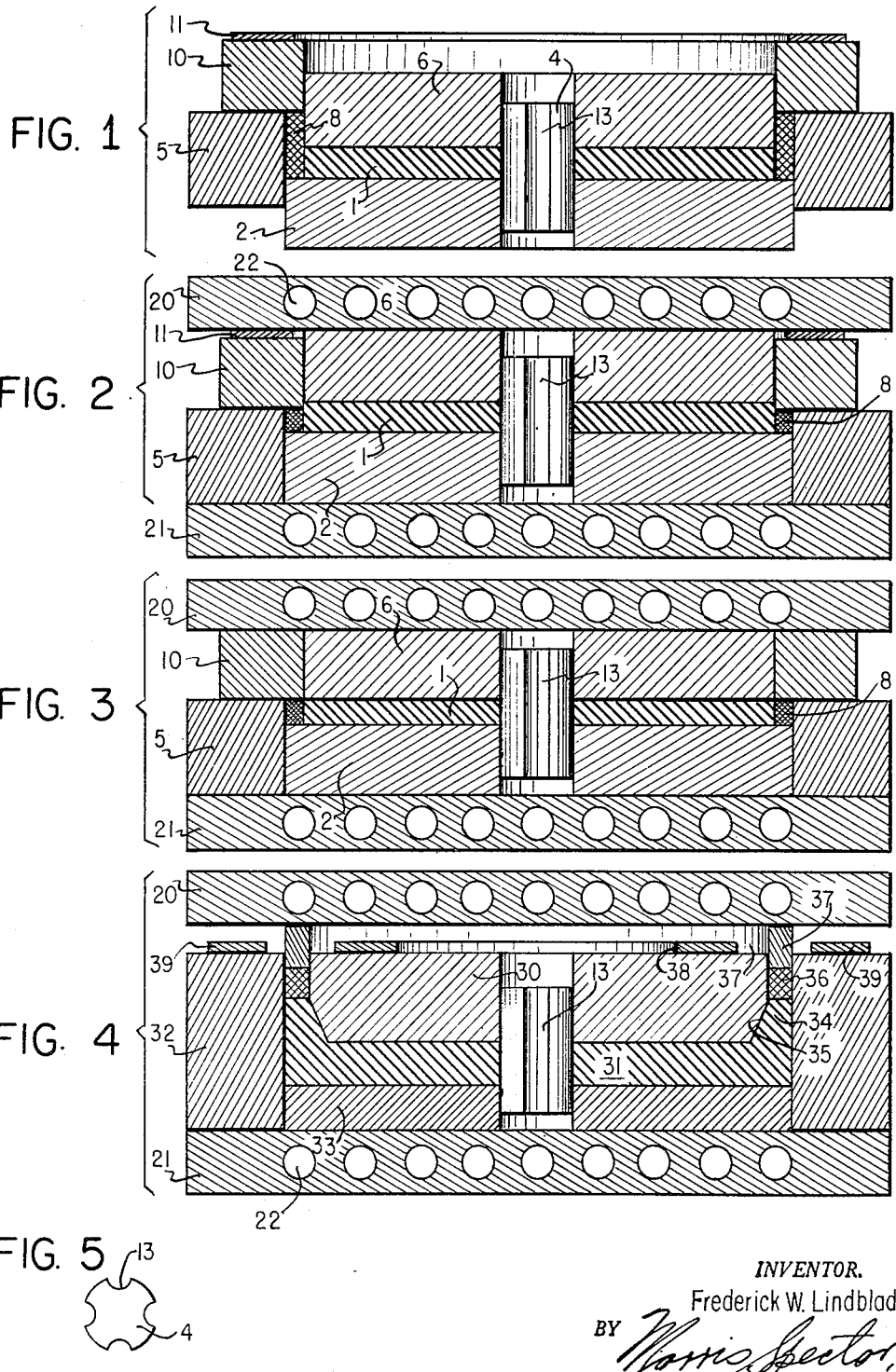
March 8, 1955 — F. W. LINDBLAD — 2,703,437
METHOD OF MAKING ABRASIVE ARTICLES
Filed Sept. 1, 1950
INVENTOR.
Frederick W. Lindblad
BY
Attorney

2,703,437

METHOD OF MAKING ABRASIVE ARTICLES

Frederick W. Lindblad, Aurora, Ill.

Application September 1, 1950, Serial No. 182,828

8 Claims. (Cl. 18—59)

This invention relates to a method of making a grinding wheel and particularly to a method of uniting a grinding surface of diamond particles with a preformed backing support of plastic composition.

In the manufacture of one piece grinding wheels having a surface of diamond particles it has been difficult to localize the diamond particles at the grinding surface. As a result a much greater amount of diamond particles was required because some diamond particles were embedded in the body of the wheel at such depths that they could never perform any actual grinding regardless of how far down the wheel might be worn. Some grinding wheels were made by making the backing support and the grinding surface separately and then cementing the grinding surface to the backing support. In this type of wheel the grinding surface is comprised of a mixture of a substantial proportion of diamond particles held together by a suitable binding agent. The diamond particles are properly localized at the grinding surface of the wheel but the process of cementing the strip of diamond particles and binder to the backing support is expensive. This is particularly true where a specially designed grinding wheel requires a grinding surface of unusual shape or location. The failure of the cement to hold the grinding surface to the backing support for any reason causes failure of the wheel in operation.

It is one of the objects of the present invention to provide a method of making a grinding wheel having a grinding surface comprising a mixture of diamond particles and a binding agent integrally united with a preformed central support of plastic composition. It is a further object of the present invention to provide a method of making a grinding wheel of the above mentioned character wherein the diamond wheel is molded to the preformed plastic support and the plastic support acts as a fixed or immovable mold wall during the molding of the diamond abrasive wheel. It is a still further object of the present invention to provide a method of molding which will assure a proper location of all of the diamond abrasive mix on the plastic support in such a position that all of the diamond mix remains available for grinding operations. It is a still further object of the present invention to provide a method of making an abrasive grinding wheel wherein the plastic support for the abrasive mix is premolded and partially cured before molding of the abrasive ring, and wherein the abrasive ring is then molded substantially to size and substantially cured before the central support is molded to size and cured.

The attainment of the above and further objects of the present invention will be apparent from the following specification taken in conjunction with the accompanying drawing forming a part thereof.

In the drawing:

Figure 1 is a sectional view of a mold assembly just after the diamond mix has been added and before placing the mold in the press;

Figure 2 is a view of the mold of Figure 1 in the press just after the preliminary compression and curing of the abrasion ring;

Figure 3 is a view similar to Figure 2 showing the position of the mold parts after the preform has been completely pressed;

Figure 4 is a sectional view of a mold illustrating a method of molding a side rim type of abrasion wheel; and Figure 5 is a top view of the centering arbor of Figures 1 through 4.

Reference may now be had more particularly to the drawing wherein like reference numerals designate like parts throughout.

The first step in the present method comprises the formation of a partially cured central support for the diamond wheel. This partially cured central support or preform is made of any suitable plastic material of the type which can be partially cured and will then hold its rigid shape until it is subsequently subjected to heat and pressure to cause it to assume the desired mold shape and to cause it to be permanently cured. The central support in this instance comprises a circular molded disc 1 of, for example, a phenol condensation product known as "Bakelite" the polymerization of which has not been completed. After the disc 1 has been partially cured it is removed from its mold and the wax coating on its periphery, which results from the fact that the disc 1 was molded in a waxed mold, is removed. The wax film may be removed from the disc 1 in any desired manner, as by using a solvent, or by machining it off, or in some instances by applying a sand blast. The preform 1 is carefully inspected and, if defective, it is discarded at this stage so that the more expensive subsequent operations are not wasted on a defective central support.

The disc 1 is of a diameter exactly equal to its desired diameter in the finished grinding wheel, having been brought to this desired exact diameter either by the original molding or by having been machined down to that diameter. The disc 1 is of a thickness slightly greater than its ultimately desired thickness in the abrasion wheel, the exact amount of excess being unimportant. The disc 1 has a central circular hole therethrough. The disc or preform 1 is placed in a mold consisting of a circular metal base plate 2 having a centering hole in which is mounted a metal arbor 4. A metal ring 5 surrounds and snugly fits the base plate 2. The ring 5 is of a height greater than the thickness of the plate 2 by an amount equal to the desired thickness of the grinding wheel. The inside diameter of the ring 5 is exactly equal to the desired outside diameter of the finished grinding wheel so that the annular space between the metal ring 5 and the periphery of the disc 1 is exactly equal to, or slightly less than, the desired thickness of the annular diamond abrasion ring on the finished wheel. An upper movable circular metal mold plate 6 having a central opening into which the arbor fits snugly is placed over the preform 1. The plate 6 is of the same diameter as the diameter of the disc 1.

A diamond mix 8 is then placed in the annular space between the inner surface of the preform 1 and the ring 5. The desired amount of diamond mix is carefully calculated so that the amount placed in the mold is such that when it is compressed at a temperature of approximately 320° F. and under a pressure of from three to five tons per square inch the diamond mix will be of the requisite compactness when it is made to occupy the volume of the annular space between the preform 1 and the ring 5 to the ultimately required thickness of, say, one-half inch. Thereafter an upper metal ring 10 is placed around the plate 6, fitting snugly therearound. The height of the ring 10 is exactly equal to the height of the plate 6.

The arbor 4 is a cylindrical metal rod of such diameter that it fits snugly within the central hole in the disc 1 and in the plates 2 and 6. In the periphery of the arbor 4 there are milled a number of lengthwise extending sprues 13 for a purpose which will be more fully set forth as this description proceeds.

An annular metal spacer or shim 11 is then placed on the ring 10. This shim is of a thickness at least equal to the excess thickness of the disc 1 over and above its desired ultimate thickness. During assembly of the mold of Figure 1 the ring 5 is supported above the bottom of the plate 2 in any desired manner as, for instance, by supporting blocks. The ring 5 makes a sufficiently close fit with the periphery of the plate 2 that when the supporting blocks are removed and the ring 5 is not subjected to pressure it does not slide downwardly on the plate 2 but remains relative to the plate 2 in the position in which it has been placed.

The mold of Figure 1 is then placed in a press between upper and lower platens 20—21, the plate 2 resting on the platen 21. Each of the platens 20—21 has openings 22 therein for the circulation of a heating medium, such as live steam, therethrough. At this time the platen 20 is appreciably above the shim 11. The mold is heated by circulating the live steam through the openings 22 and the platens 20—21 are forced towards one another. This places the diamond mix under pressure but does not place the preform 1 under axial compression. The upper platen 20 is at this time separated from the plate 6 by an air space which reduces the rate of heat transfer from the upper platen through the plate 6 to the preform 1. As a result the hottest region within the molding portion of the die is in the region along the periphery where the diamond mix is located. This region is the region that is also being subjected to pressure. As a result the temperature of the diamond mix rises appreciably faster than the rate of rise of the temperature of the preform, and the diamond mix commences to flow before the preform 1 has been raised to a temperature sufficient to cause it to flow. The outer periphery of the disc or preform 1 therefore acts as a mold wall for the inner periphery of the diamond mix. The diamond mix is thus compressed by the movement of the platens 20—21 towards one another. The pressure applied to the platens 20—21 is of such a magnitude that the pressure per square inch on the area of the annular ring 8 is approximately 6,000 to 10,000 pounds per square inch. The platens 20—21 continue to move towards one another and press the diamond mix together until the ring 5 comes into contact with the lower platen. This fixes the extent to which the platens can approach one another and therefore fixes the distance between the top of the plate 2 and the bottom of the ring 10, thereby fixing the thickness of the molded diamond abrasion wheel formed from the mix 8. The heat and pressure are maintained on the platens 20—21 for a period of time required to effect a substantially complete curing of the molded plastic material of the diamond mix formed from the mix 8. During this time the pressure of the plate 6 on the preform 1 cannot rise to any substantial amount because the total original pressure which was sufficient to exert a pressure of 6,000 to 10,000 pounds per square inch on the annular ring of the diamond mix 8 is now spread over a much greater area so that the pressure per square inch is very small.

After the required time interval of four or five minutes, which is sufficient to cure the diamond section enough to withstand the radial pressure which will later be exerted thereagainst by the disc 1, the platens 20—21 are separated and the shim 11 is removed. The platens 20—21 are then again brought together to exert a pressure on the plate 6. The required pressure is approximately 2,500 pounds per square inch. At this time the platen 20 is in intimate heat transfer contact with the plate 6 and causes a rise in temperature of the disc 1. The disc ultimately commences to flow and since it is confined on its outer periphery by the diamond ring formed from the mix 8 all of the flow must take place inwardly. The excess material of the disc 1, therefore, flows into the sprues 13 in the arbor. When the platens have been compressed towards one another to the position illustrated in Figure 3, where the platen 20 bears against the ring 10, further compressive movement of the platens 20—21 cannot take place, and the disc 1 is held to a thickness equal to the thickness of the molded abrasive ring formed from the mix 8. The platens 20—21 are held in the position of Figure 3 an amount of time required to effect a complete cure of the disc 1. If the diamond ring formed from the mix 8 had not been fully cured previously it now is fully cured. Thereafter the mold parts are separated. The molded wheel comprising the disc 1 with the annular ring formed from the mix 8 integrally molded thereon is complete except for the necessary removal of the excess material of the disc 1 that was caused to flow into the spruces 13. This material may be machined off.

It will be understood that the exact temperatures and pressures to be applied in the various stages of the process hereinabove described will be determined by the specific compositions used. Although any number of different compositions may be used it is preferred that the diamond mix be of a composition such as is disclosed in my pending application Serial No. 596,401, filed May 28, 1945, now abandoned.

In making a wheel having a grinding surface on the side of the wheel disc the specific steps in the process differ from those hereinabove described, although the process is broadly the same. A grinding wheel disc 31 of partially cured plastic material the same as that of the disc 1 is provided. This disc is of exactly the requisite outside diameter and is of a thickness slightly greater than the requisite thickness. After the disc 31 has been molded and the wax film coating it has been removed it is inspected for defects and if it passes inspection it is placed in a mold having an outer metal ring 32 and a lower metal plate 33. An arbor such as was previously described is placed through the center of the disc 31 and extends into the central hole in the plate 33. Thereafter a metal core 30 is centered inside the skirt of the disc 31, the core 30 being itself a part of the mold previously used for molding the disc 31. A predetermined quantity of diamond mix 36 is then placed on the exposed top of the disc 31. An annular metal ring 37 is then positioned between the outer ring 32 and the core 30, said ring 37 fitting snugly between the outer ring 32 and the core 30. A shim 38 in the form of a circular ring is placed on the core 30. A series of spacer blocks 39 are then placed on top of the ring 32. The spacer blocks 39 are of at least the same thickness as the thickness of the shim 38.

The mold assembly is placed between the upper and lower platens 20—21, as previously described, which are heated by the circulation of steam therethrough and are compressed at the pressures mentioned previously. At this time heat is transferred from the upper platen 20 through the metal ring 37 to the diamond mix 36. The air space between the upper platen and the core 30 reduces the rate of heat transfer to the disc 31. As a result the temperature of the ring of diamond mix 36 rises more rapidly and, being subject to pressure, it is caused to flow before the disc 31 commences to flow. The compressive action continues until the bottom of the platen 20 engages the top of the blocks 39. This brings the bottom of the ring 37 a distance above the top of the disc 31 exactly equal to the calculated required thickness of the molded diamond abrasive ring. The temperature and pressure are maintained for a few minutes sufficient to effect a substantially complete polymerization or curing of the diamond ring 36. Thereafter the blocks 39 are removed and the pressure is increased. The temperature of the preform 31 rises first, because of the time interval and second, because the platen 20 is in physical contact with the shim 38 thereby increasing the rate of heat transfer. The partially cured disc 31 ultimately commences to flow. The excess material flows into the sprues 13. This compression continues until the bottom of the platen 20 engages the top of the ring 32. This therefore accurately determines the final thickness of the finished abrasion wheel. The initial thickness and quantity of material in the backing support 31 is greater than the amount in the finished product, the excess being forced to flow into the sprues 13.

In the description of Figures 1, 2 and 3 I have spoken of the preform 1 as being of a diameter exactly equal to its diameter in the finished grinding wheel. This is the ideal arrangement but if the ideal condition is not attainable care is taken that any deviation as to the diameter of the preform, if there is a deviation, shall be one of over size rather than under size. If the preform 1 is slightly over sized as to diameter the diamond mix when subjected to its pressure, before the preform has been cured, will act on the slightly over sized preform and will cause the material of the preform to flow, so that ultimately the diamond ring will be of the requisite thickness, and no greater. If the diamond ring formed from the mix 8 were molded around a fully cured preform, then any errors in the diameter of the preform would manifest themselves in a corresponding deviation of the thickness of the diamond ring. By the present invention the thickness of the diamond ring is determined accurately by the quantity of diamond material introduced, which quantity is held between the plate 2, the ring 5 and the ring 10, the inner diameter being then variable as determined by the quantity of the diamond mix. The same principles apply as to the embodiment illustrated in Figure 4, wherein the height of the disc 31 is variable under the pressure encountered in the mold, due to the fact that the wheel disc 31 is only partially cured. The ultimate height of the top of the rim 34 of the disc, above the metal plate 33, is determined by the sizes of the mold parts of Figure 4 and the quantity of diamond mix at 36, the latter of which is very accurately calculated. Therefore, if the height of the partially cured disc 31 is slightly in excess of the preferred height no harm will result, and the finished wheel will be of exactly the required height.

The method of making diamond grinding wheels as hereinabove described results in a balanced wheel because if the partially cured preform 1 is initially unbalanced, the pressure and temperature to which it is subjected during the process above described results in a flow of material which will necessarily cause the material at the greater density or thickness to flow until uniformity results. By the present process there is a greater adherence of the rim portion to the core portion because the rim portion is homogeneously cured with the core portion. The present method results in the combination of an axial and a radial molding pressure against the diamond wheel formed from the mix 8, which gives greater control in the molding and resulting greater uniformity through the abrasive section. The extent of the radial pressure can be controlled by the sizes of the sprues 13 in the arbor.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A method of forming a grinding wheel which comprises centering a pre-formed backing support in a mold so as to form an annular space around the periphery of said pre-formed backing support, positioning a predetermined quantity of moldable plastic abrasive mix in said annular space, compressing said abrasive mix to a final and lesser thickness than the thickness of said pre-formed backing support, heating the mix to flow said abrasive mix, then compressing said pre-formed backing support to the same thickness as the thickness of said abrasive mix, and then bringing the backing support and the mix to a temperature and pressure sufficient to effect a final cure of both the backing support and the mix.

2. A method of forming a grinding wheel which comprises providing a pre-formed partially cured backing support of more material than its ultimate requirement in the wheel, centering the support in a mold which leaves an annular space around the periphery of said pre-formed backing support, positioning a predetermined quantity of moldable plastic abrasive mix in said annular space, compressing said abrasive mix to a lesser thickness than the thickness of said pre-formed backing support, flowing said abrasive mix and at least partially curing the same to mold the mix to a final shape, then applying sufficient heat and pressure to the pre-formed backing support to completely cure and mold the support to the same thickness as the thickness of said abrasive mix while providing an overflow space which is apart from the abrasive mix for the flow of excess material from the preformed backing support.

3. A method of molding a grinding wheel comprising the placing in a mold of a rigid uncured plastic backing support containing more material than is ultimately required in the backing support in the finished wheel, placing a moldable abrasive mix in the same mold in intimate contact with said backing support, molding said abrasive mix against said backing support to its ultimate size and at least partially curing the mix by applying heat and pressure to the abrasive mix while maintaining the backing support at a pressure and temperature insufficient to deform the same, then converting said backing support to a plastic state and compressing the same to size against said abrasive mix which has already been molded to substantially its ultimate size and during said compression of the backing support providing an overflow space which is contiguous with but outside of the space to be occupied by the finished backing support, and flowing the excess material of the backing support into said space.

4. In a method of making a grinding wheel, the steps of providing a preformed and a partially cured plastic backing support containing more material than is required for the backing support in the final wheel, positioning a moldable plastic composition constituting the grinding mix in association with the backing support, at least partially curing and flowing the grinding mix to its ultimate size and shape by the application of heat and pressure thereto while avoiding the application of heat and pressure to the backing support in an amount necessary to cause the support to flow, whereby the backing support remains in a non-flowing stage during the flowing of the grinding mix, then completely curing and flowing the backing support to its required size by the application of heat and pressure so that the grinding mix is in its non-flowing stage during the flowing of the backing support and flowing the excess material from the backing support at the center thereof where it can be readily removed.

5. A method of forming a grinding wheel which comprises centering a moldable preformed backing support in a mold so as to form an annular space around the periphery of said preformed backing support, positioning a predetermined quantity of moldable abrasive mix in said annular space, compressing said abrasive mix to a final and lesser thickness than the thickness of said preformed backing support, heating the abrasive mix to a temperature above its flow temperature and applying pressure thereto to mold the same to shape and to cure the mix at least partially while maintaining the backing support below its flow temperature, and then heating the preformed backing support and abrasive mix and compressing said preformed backing support to the same thickness as the said thickness of said abrasive mix to cure said backing support completely, the heating of the backing support and the mix being to a temperature sufficient to complete the curing of said abrasive mix.

6. A method of forming a grinding wheel which comprises providing a moldable backing support of more material than its ultimate requirement in the wheel and having an accurately formed grinding mix-receiving surface, placing the support in a mold, positioning a predetermined quantity of a moldable abrasive mix in the mold in engagement with said surface, applying pressure to aid in effecting the flowing of the abrasive mix and the backing support in said mold to the desired size, providing an overflow space for receiving the excess material of the backing support and in said flowing of the backing support flowing the excess backing support material into said overflow space where it may thereafter be removed from the backing support to reduce the quantity of the material in the backing support to the desired amount.

7. In a method of making a grinding wheel, the steps of providing a rigid moldable central backing support containing more material and being of a greater thickness than desired in the final grinding wheel and having a peripheral abrasive rim-receiving surface which is adapted to act as a non-deformable mold wall during the subsequent molding of the rim as herein set forth, positioning a predetermined quantity of a moldable abrasive-containing material adjacent to said outer surface of said backing support and compressing and molding the same against and in intimate contact with said backing support surface to form an abrasive rim of the desired size and which is sufficiently rigid to act as a non-deformable mold wall during the subsequent molding of the backing support, then converting said backing support into a plastic condition and molding said backing support under pressure to the desired thickness against said abrasive rim, and providing an overflow space for receiving the overflow of excess material from said backing support during the last mentioned molding of the backing support.

8. In a method of making a grinding wheel, the steps of providing a moldable rim backing support containing more material than is needed, forming a rigid abrasive rim for the wheel having the final desired size and shape, then converting said backing support to a plastic state and molding the same to the desired size and shape against said abrasive rim by the application of pressure to the backing support material and providing an overflow space contiguous with the central portion of the backing support, and flowing the excess backing support material into said overflow space.

References Cited in the file of this patent

UNITED STATES PATENTS

| | | |
|---|---|---|
| 1,981,970 | Sanford | Nov. 7, 1934 |
| 2,073,590 | Sanford | Mar. 9, 1937 |
| 2,137,986 | Sanford | Nov. 22, 1938 |
| 2,334,048 | Van Der Pyl | Nov. 9, 1943 |
| 2,398,890 | Howard | Apr. 23, 1946 |
| 2,469,398 | Meyer | May 10, 1949 |